United States Patent
Tsuda et al.

(10) Patent No.: US 6,723,157 B2
(45) Date of Patent: Apr. 20, 2004

(54) MATERIAL FOR CAPTURING CHEMICAL SUBSTANCE, METHOD FOR PRODUCING THE SAME, AND CHEMICAL SUBSTANCE-CAPTURING TUBE

(75) Inventors: Takao Tsuda, 3102, Kaguyama 2-chome, Nisshin-shi, Aichi (JP); Motonori Munesue, 178-11, Kitashinmachi 6-chome, Matsubara, Osaka (JP)

(73) Assignees: Takao Tsuda, Aichi (JP); Sun Plastics Co., Ltd., Osaka (JP); Motonori Munesue, Osaka (JP)

( * ) Notice: Subject to any disclaimer, the term of this patent is extended or adjusted under 35 U.S.C. 154(b) by 0 days.

(21) Appl. No.: 10/454,140

(22) Filed: Jun. 4, 2003

(65) Prior Publication Data

US 2003/0209146 A1 Nov. 13, 2003

Related U.S. Application Data

(63) Continuation of application No. PCT/JP00/08679, filed on Dec. 7, 2000.

(51) Int. Cl.$^7$ .......................... B01D 15/08; B01D 53/04
(52) U.S. Cl. .......................... 96/101; 96/108; 96/135; 96/453; 55/514; 55/524; 55/528; 55/DIG. 5; 210/198.2
(58) Field of Search .......................... 96/101, 108, 135, 96/153; 55/514, 518, 519, 524, 527, 528, DIG. 5; 210/198.2

(56) References Cited

U.S. PATENT DOCUMENTS

| | | | |
|---|---|---|---|
| 2,178,614 A | * 11/1939 | Slayter | 55/524 |
| 2,566,960 A | * 9/1951 | Philipps | 428/378 |
| 3,019,127 A | * 1/1962 | Czerwonka et al. | 428/338 |
| 3,413,982 A | * 12/1968 | Sublett et al. | 131/343 |
| 4,431,542 A | * 2/1984 | Dingfors et al. | 210/502.1 |
| 4,640,909 A | * 2/1987 | Ramsden et al. | 502/407 |
| 4,650,784 A | * 3/1987 | Ramsden et al. | 502/407 |
| 4,732,687 A | * 3/1988 | Muller et al. | 210/656 |
| 5,248,428 A | * 9/1993 | Hagen et al. | 210/656 |
| 5,350,443 A | * 9/1994 | von Blucher et al. | 96/135 |
| 5,486,410 A | * 1/1996 | Groeger et al. | 442/353 |
| 5,505,769 A | * 4/1996 | Dinnage et al. | 96/153 |
| 5,609,756 A | * 3/1997 | Betz et al. | 210/198.2 |
| 5,637,135 A | 6/1997 | Ottenstein et al. | |
| 5,662,728 A | * 9/1997 | Groeger | 96/153 |
| 5,800,706 A | * 9/1998 | Fischer | 210/198.2 |
| 5,951,744 A | * 9/1999 | Rohrbach et al. | 96/154 |
| 6,136,187 A | * 10/2000 | Zare et al. | 210/198.2 |
| 6,528,167 B2 | * 3/2003 | O'Gara | 428/405 |
| 2001/0029843 A1 | * 10/2001 | Minoru et al. | 96/135 |
| 2002/0005383 A1 | * 1/2002 | Voute et al. | 210/656 |

FOREIGN PATENT DOCUMENTS

| | | |
|---|---|---|
| JP | 03-187903 A | 8/1991 |
| JP | 04-243505 A | 8/1992 |
| JP | 05-346422 A | 12/1993 |
| JP | 08-246210 A | 9/1996 |
| JP | 11-128632 A | 5/1999 |
| WO | WO 99/38006 A1 | 7/1999 |

* cited by examiner

Primary Examiner—Robert H. Spitzer
(74) Attorney, Agent, or Firm—Akin Gump Strauss Hauer & Feld L.L.P.

(57) ABSTRACT

A material is provided for capturing a chemical substance comprising fibers which carry metal alkoxide particles on the surfaces thereof. The metal alkoxide particles are made from an oligosilica, an oligozirconia, an oligotitiania, or the like. The fibers may include inorganic fibers, regenerated fibers and/or synthetic fibers. The material for capturing a chemical substance is produced by a method comprising steps of subjecting the fibers to a surface treatment for facilitating adhesion of the metal alkoxide particles to the surfaces of the fibers, forming the metal alkoxide particles on the surfaces of the fibers, and fixing the metal alkoxide particles to the surfaces of the fibers. A chemical substance-capturing tube, capable of capturing a trace of a chemical substance in a liquid or a gas, can be produced by placing the fibers, i.e., the material for capturing a chemical substance, in a hollow tube.

41 Claims, 9 Drawing Sheets

×200  100μm

×1,000　10 μm

×10,000  1 μm

MATERIAL FOR CAPTURING CHEMICAL SUBSTANCE, METHOD FOR PRODUCING THE SAME, AND CHEMICAL SUBSTANCE-CAPTURING TUBE

CROSS-REFERENCE TO RELATED APPLICATIONS

This application is a continuation of International Application No. PCT/JP00/08679, filed Dec. 7, 2000, the disclosure of which is incorporated herein by reference.

BACKGROUND OF THE INVENTION

This invention relates to a fibrous material for capturing a chemical substance used in the field of separation analysis of chemical substances, such as liquid chromatography and gas chromatography, to a method for producing the material, and to a tube for capturing a chemical substance using the material.

As a material used for capturing liquid-diluted samples, a material put into a hollow polyethylene tube or a syringe-type plastic container is known. The material has silica gel particles, silica gel or polymer particles with chemically modified surfaces, assemblies of a material made of glass fibers or tetrafluoroethylene fibers tangling with silica gel particles, or the like, being held between frits in the container. It is broadly used for solid phase extraction.

A plastic container in which the assemblies of the above material are packed has a defect that flow resistance is strong. There is another defect that a great deal of solvent is required to move constituents of a sample. Furthermore, the material is liable to be unevenly bedded at the time of loading the material into the plastic container. Therefore, the capturing efficiency may decrease because large passages are generated in the loading material.

As prior art, there is also a material of a disc type in which a loading material for capturing a chemical substance is made of the above particles and formed into woven fabric, which is held between frits in the container. The material is unified and formed into a disc to be treated. The material of such a disc type needs to be sufficiently hardened in a manner of hardening the particles from the edge.

BRIEF SUMMARY OF THE INVENTION

Hence, objects of the present invention are to remedy the above defects and provide a reliable material which can capture an objective chemical substance from a diluted sample and a method for producing the same, and to provide a capturing tube made of the material.

In the present invention, a material for capturing a chemical substance is made of a form of fiber, i.e., fibers which have particles made from metal alkoxide on surfaces thereof. The metal alkoxide includes oligosilica, oligozirconia, oligotitania and the like, which produce particles. In this specification, the particles mentioned above are called metal alkoxide particles.

In the present invention, a method for producing the above material includes a step of treating surfaces of the fibers to facilitate the fixation of metal alkoxide thereto, a step of forming metal alkoxide particles on the surfaces of the fibers, and a step of fixing the metal alkoxide particles to the surfaces of the fibers.

In the present invention, a tube for capturing a chemical substance is a hollow tube which holds the fibrous material for capturing a chemical substance mentioned above and captures a small amount of chemical substance from a liquid or gas.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Embodiments of the present invention are described below based on specific, non-limiting examples in conjunction with the accompanying drawings.

EXAMPLE 1

In this example of the present invention, a material having silica particles on surfaces of glass fibers was provided for capturing a chemical substance.

Figure 1:
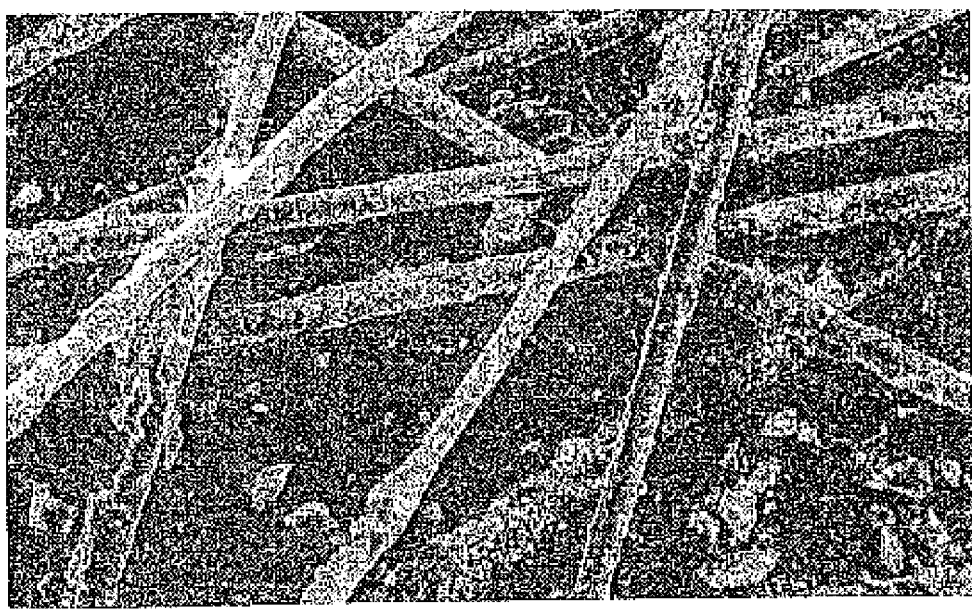
FIG. 1 is a magnified micrograph of the glass fibers having the silica particles made from 50% oligosilica according to Example 1.
Figure 2:
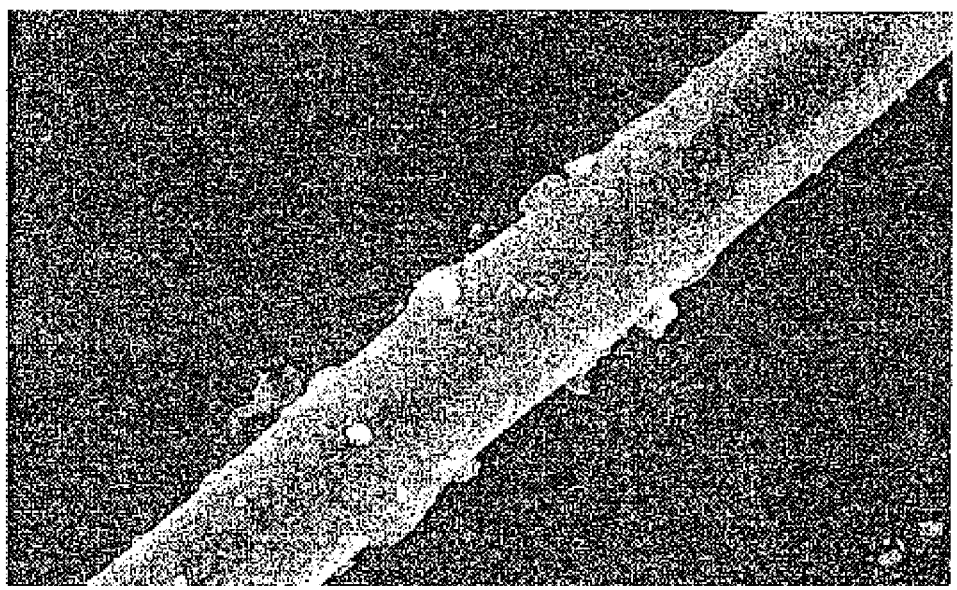
FIG. 2 is a magnified micrograph of a single piece of the glass fiber having the silica particles made from 30% oligosilica according to Example 1.
Figure 3:
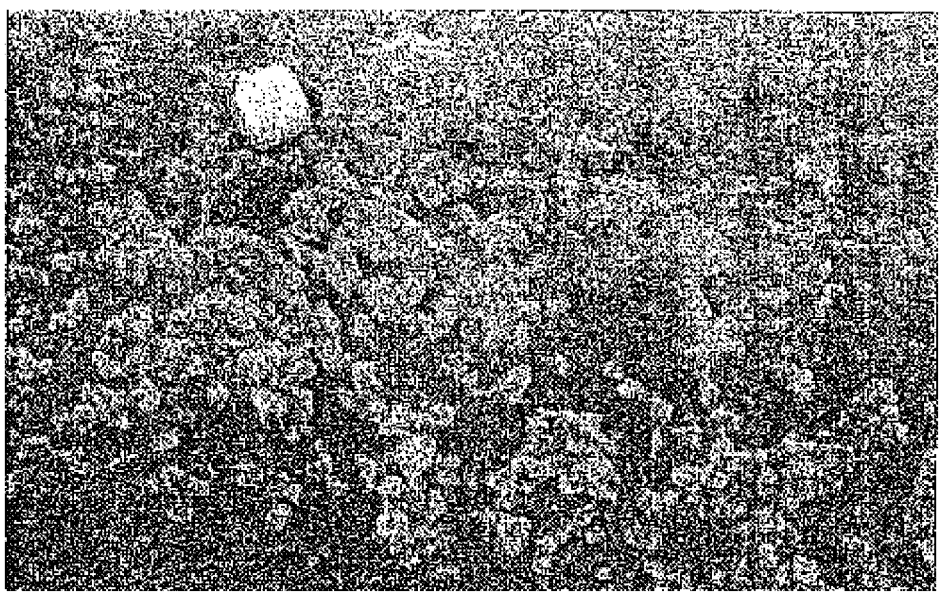
FIG. 3 is a magnified micrograph of the surface of the glass fiber having the silica particles made from oligosilica according to Example 1.

FIGS. 1–3 are micrographs which show glass fibers having silica particles. FIG. 1 is a 200-fold magnified micrograph of glass fibers having silica particles made from 50% oligosilica. FIG. 2 is a 1,000-fold magnified micrograph of a single piece of glass fiber having silica particles made from 30% oligosilica. FIG. 3 is a 10,000-fold magnified micrograph of glass fiber having silica particles. FIG. 3 clearly shows silica particles attaching to the surface of the glass fiber.

A material for capturing a chemical substance according to the present invention was made in a manner as follows.

Producing Process 1: Pretreatment

Surface treatment was carried out as a pretreatment process to facilitate the fixation of oligosilica to surfaces of quartz glass fibers. As the surface treatment, there is alkali treatment, which was carried out for 30 minutes with a sodium hydroxide solution (1N) at 80° C. The treatment is not limited to alkali treatment like this, and surface treatment with a silylation agent and coating treatment with water glass could be adopted.

Subsequently, the quartz glass fibers which had the surface treatment were washed with ethanol, and the alcohol was removed by centrifugal separation.

Producing Process 2: Application of Oligosilica

Oligosilica was applied to the surfaces of the quartz glass fibers. Appropriate oligosilica was a chemical substance polymerized from tetraethoxysilane, while the polymerization degree was conducted in a range of 10 to 20. Since oligosilica has a structure very similar to quartz glass and easily adapts to a surface of quartz glass, stabilization by fixing the oligosilica to the surface proceeded quickly. The oligosilica with a polymerization degree in a range 10 to 20 easily forms cores for producing silica particles. Therefore, by using the oligosilica, stable formation of silica particles on the surface of the quartz glass was obtained.

The application of the oligosilica was carried out in a manner where the quartz glass fibers were put into a 30% oligosilica solution, and excess oligosilica solution was removed from the surfaces of the quartz glass fibers by centrifugal separation. In this process, the oligosilica remained on the surfaces of the quartz glass fibers.

Producing Process 3: Formation of Silica Particles with Alkali Solution

The above quartz glass fibers were put into a 40% aqueous ammonia solution and were let sit in this state for one hour. During this step, formation of silica particles on the surfaces of the fibers proceeded. Subsequently, the aqueous ammonia solution was removed from the surface of the quartz glass fibers by centrifugal separation.

Producing Process 4: Heat Treatment

The above quartz glass fibers were put into an oven and heated up continuously from 80° C. to 180° C. By such a continuous heat-up treatment, the silica particles were fixed to the surfaces of the quartz glass fibers.

By the above Producing Processes 1–4, the glass fibers having the silica particles on the surfaces thereof were formed. In order to improve the efficiency of holding an objective chemical substance, it is possible to add the following Producing Process 5.

Producing Process 5: Chemical Modification

The silica particles can have chemical modification treatment (e.g., chemical modification treatment with octadecylsilane). As a functional group, an alkyl group, γ-aminopropyl group, a cyanoethyl group, a cyclodextrin group, an ion-exchange group, or the like, is available.

Figure 4:
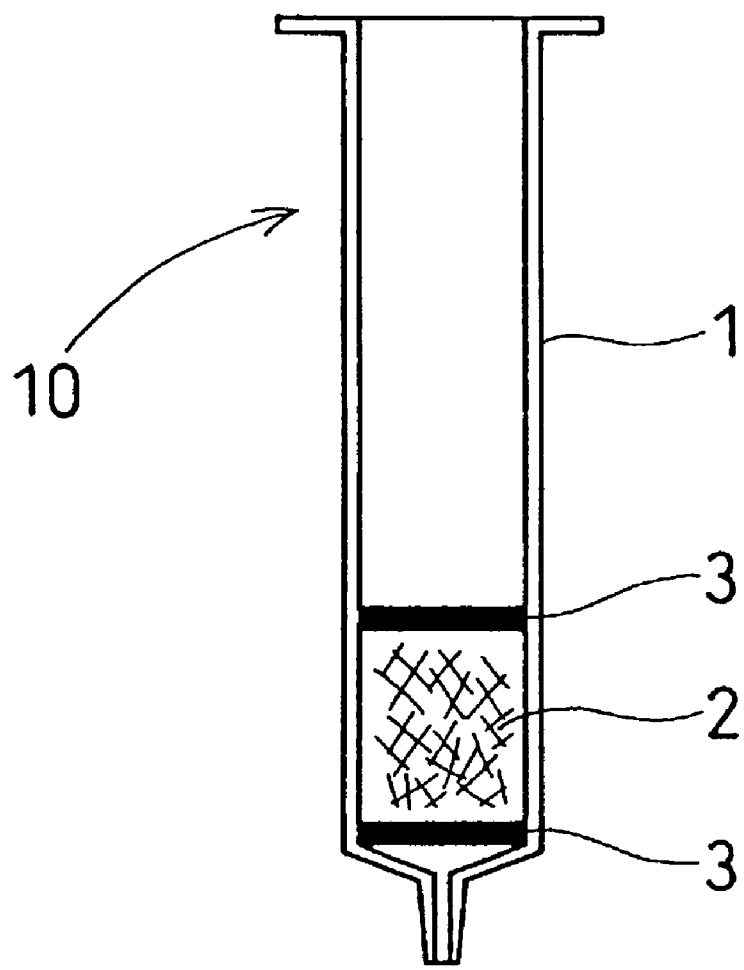
FIG. 4 shows an example of a tube for capturing a chemical substance made of a hollow tube in which a fibrous material having metal alkoxide particles is held.

Using the glass fibers having the submicroscopic silica particles obtained as described above, a tube 10 was produced for capturing a chemical substance. An example is shown in FIG. 4. A material 2 made of the glass fibers having the silica particles was inserted into a hollow tube 1. As frits 3, polyethylene filters were used, and the glass fibers having the silica particles were held in the hollow tube 1 by them.

Particles held on the surfaces of the fibers are not limited to silica particles and can be other metal alkoxide particles instead; namely, they can be zirconia particles, titania particles or other metal particles. These particles can be respectively made from oligozirconia, oligotitania or the like.

The fibers having the above particles are not limited to quartz glass fibers, and can be other glass fibers. Furthermore, the invention is not limited to glass fibers, and can use other inorganic fibers, regenerated fibers or synthetic fibers as described later.

Figure 5:
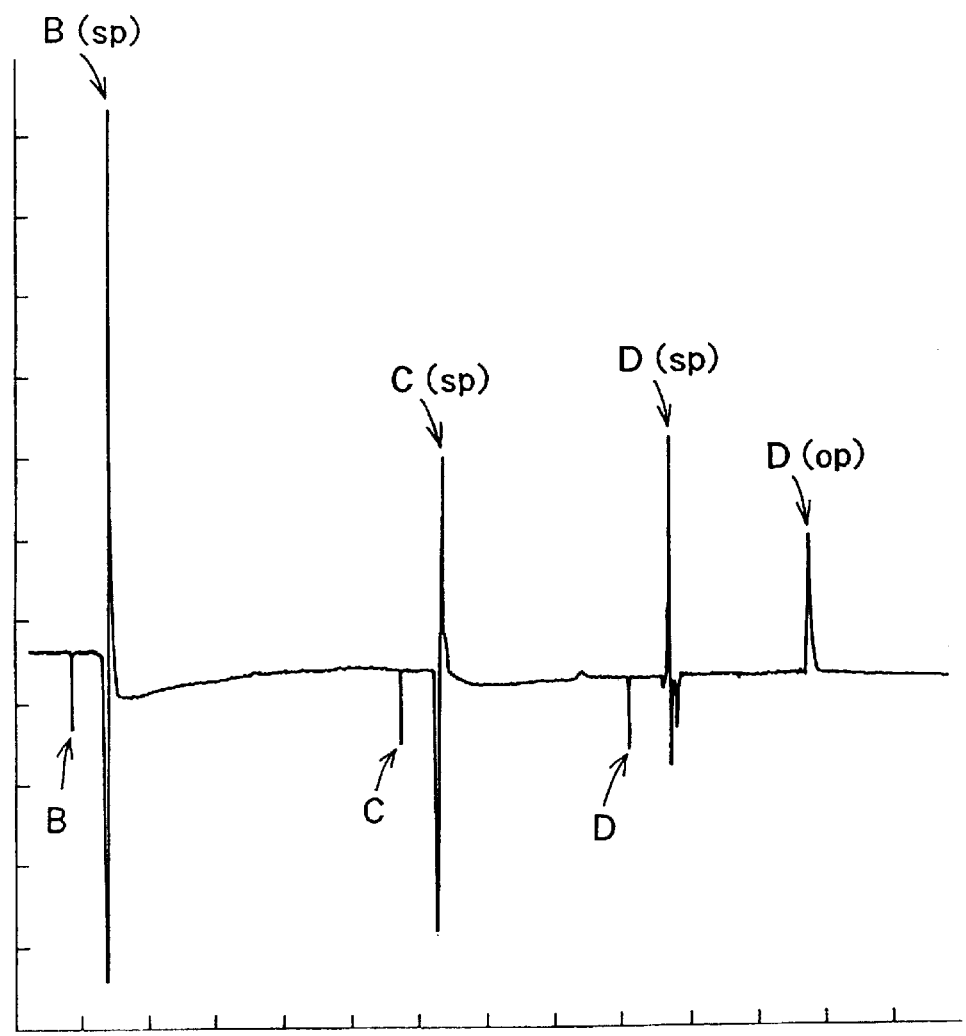
FIG. 5 is a graph of liquid chromatography using the tube according to FIG. 4 for capturing a chemical substance and shows sample solution of Example 1 in which glass fibers are used.

Subsequently, an example is described of capturing and recovering an objective sample by solid-phase extraction using the tube 10 for capturing a chemical substance according to the present invention. Liquid chromatography analysis of each eluate in Steps B, C and D is shown in FIG. 5.

Step A

The tube 10 for capturing a chemical substance (a mini-column) holding the material 2, made of the glass fibers having silica particles as shown in FIG. 4, was used. This tube 10 was washed by flowing 1 ml of methanol and then washed by flowing 1 ml of water therethrough.

Step B

A diluted sample solution containing an objective chemical substance to be recovered was poured into the above tube and flowed therethrough. In this case, 2 ml of physiological saline containing 0.9% sodium chloride and 0.01% of caffeine was used as a sample solution. The solution was poured into the tube (B in FIG. 5) and flowed therethrough. After passing through the fibers having the silica particles, the solution was analyzed. The objective chemical substance to be recovered (the caffeine) remained on the fibers having the silica particles, which were chemically modified with octadecylsilane (ODS).

Step C

As a cleaning solution, 2 ml of 1% aqueous methanol solution was poured into the tube (C in FIG. 5) and flowed therethrough. After washing the tube, the solution (the cleaning solution after passing through the tube) was analyzed.

Step D

In order to recover the caffeine held in the tube in Step B, 1 ml of 100% liquid methanol was poured into the tube (D in FIG. 5), and then the liquid methanol was completely recovered. The objective chemical substance, caffeine, was separated from the fibers having the silica and recovered as a solute in the methanol here. The recovered solution was analyzed.

In Steps A–D above, each of the solutions passing through the tube was completely removed from the tube using sucking pressure or a centrifuge. Recovery of the solution by a centrifuge was carried out in a manner that the tube was inserted into a centrifugal tube.

FIG. 5 showing the results of the analyses of the solutions, which passed through the tube in Steps B–D above, is described below in detail. B, C and D in FIG. 5 show respective pouring points of each of the solutions in Steps B, C and D. B(sp), C(sp) and D(sp) respectively show solution peaks, and D(op) shows an objective peak. The following results were found from FIG. 5.

In Step B, after pouring the sample solution including 0.01% caffeine, there is a solution peak B(sp), and then a flat base line continues to the pouring point in Step C (C in FIG. 5). Accordingly, it is obvious that the objective chemical substance (the caffeine) in the sample solution passed through the tube in Step B was completely captured on the fibers having the silica particles in the tube.

After pouring the cleaning solution (the 1% aqueous methanol solution) in Step C (C in FIG. 5), there is a solution peak C(sp), and then a flat base line continues to the pouring point in Step D (D in FIG. 5). Accordingly, it is obvious that the objective chemical substance was hardly eluted despite being washed by the aqueous methanol solution.

In Step D, in order to recover the caffeine held on the fibers, the liquid methanol (100%) was poured into the tube (D in FIG. 5) and flowed through it. After pouring the methanol, there is a solution peak D(sp), and after the solution passes through and the base line becomes flat, there is an objective peak D(op). Accordingly, it is obvious that 99% of the caffeine in the sample in Step B was recovered in the methanol.

In the above case, the glass fibers, which were inorganic fibers, were used, but even if other inorganic fibers, regenerated fibers or synthetic fibers are used, the same result is obtained.

EXAMPLE 2

In this example, a material having silica particles on surfaces of regenerated fibers is described for capturing a chemical substance.

As regenerated fibers, cellulose fibers (made by Advantech Co., Ltd., No. 5, wherein more than 99% of α-cellulose is contained) was used, and silica particles made from oligosilica were attached thereto by the Producing Process as in Example 1 above.

Figure 6:
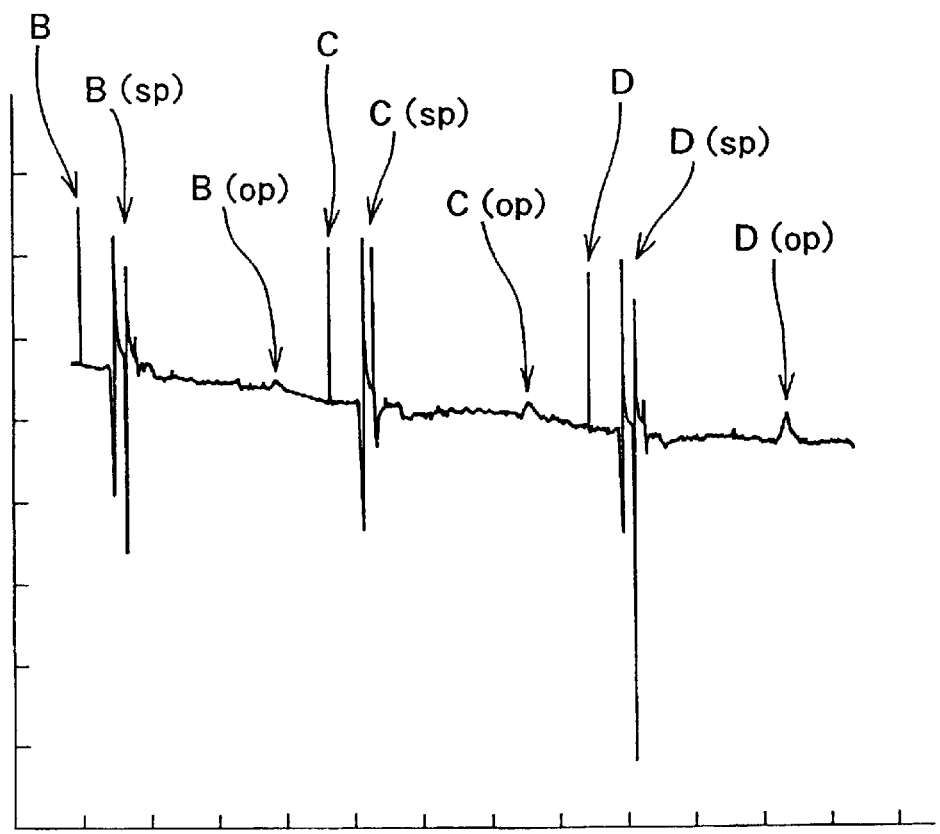
FIG. 6 is a graph of liquid chromatography using the tube according to FIG. 4 for capturing a chemical substance and shows a sample solution of Example 2 in which cellulose fibers are used.

Using the obtained cellulose fibers having the silica particles, an objective chemical substance (caffeine) was captured and recovered. Accordingly, analysis by liquid chromatography was carried out respectively in Steps of capturing and recovering as in Steps A, B, C and D in Example 1. The results are shown in FIG. 6. B, C and D in FIG. 6 show respective pouring points of the solutions in each of the steps. In FIG. 6 (sp) shows a solution peak, and (op) shows an objective peak. Accordingly, B(sp) in FIG. 6 shows a solution peak in Step B, and B(op) shows an objective peak in Step B. The same applies to Steps C and D, and to the following Examples as well. In this example, elution of the caffeine, which is the objective substance, was found in Steps B and C. Namely, 100% of the objective substance was not captured in the cellulose fibers, but the capturing efficiency was high enough as expected.

EXAMPLE 3

Furthermore, an experiment using synthetic fibers as a material for capturing a chemical substance was carried out. In this example, polytetrafluoroethylene resin fibers (hereinafter referred to as PTFE fibers) (104-C2, made by Flonchemical Co., Ltd.) were used as synthetic fibers. A 30% aqueous sodium hydroxide solution was prepared, and the PTFE fibers were soaked therein for 2–10 hours at a temperature of 80° C., so that hydrophilic groups were generated on the surfaces of the fibers. Subsequently, the fibers were washed with water and then further washed with ethanol. After that, the above Producing Processes 2 (application of oligosilica), 3 (formation of silica particles), 4 (heat treatment), and 5 (chemical modification) were carried out.

Silica particles made from oligosilica were generated on the surfaces of the PTFE fibers thus obtained and attached thereto.

Figure 7:
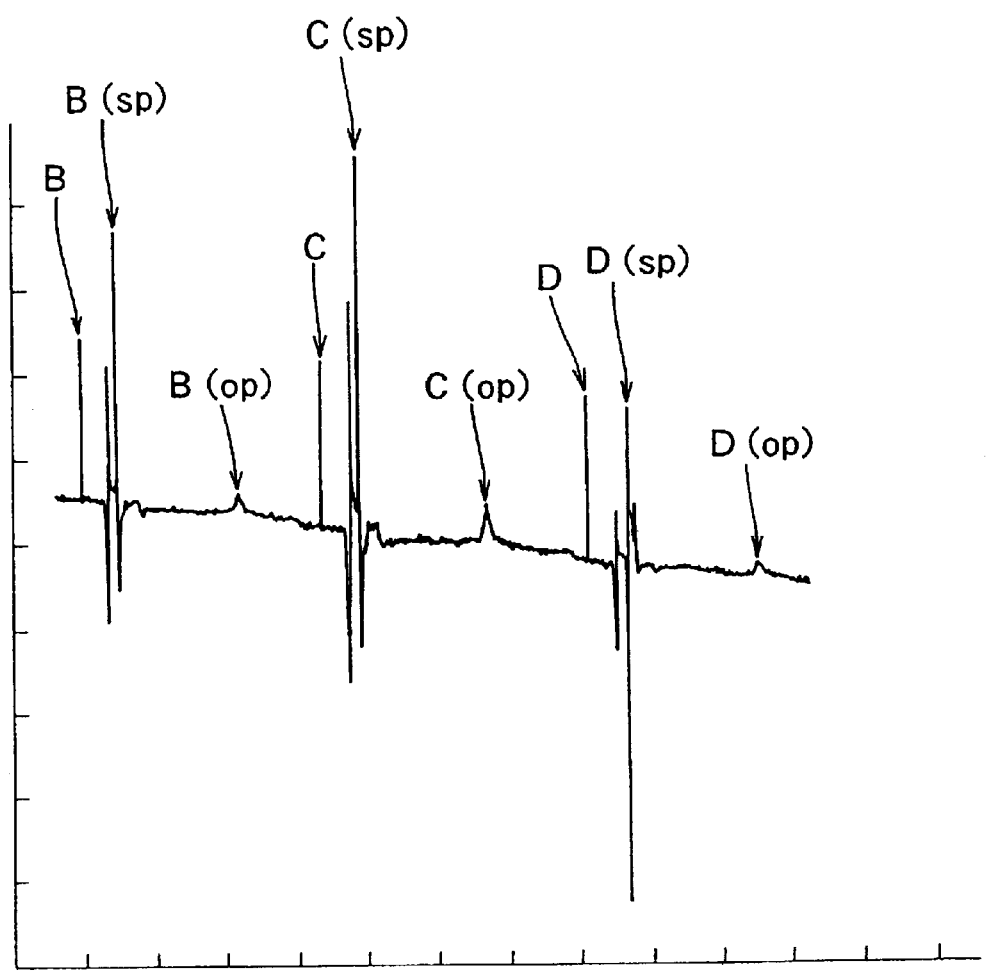
FIG. 7 is a graph of liquid chromatography using the tube according to FIG. 4 for capturing a chemical substance and shows a sample solution of Example 3 in which PTFE fibers are used.

Using the PTFE fibers having the silica particles as a material for capturing a chemical substance, an experiment was carried out in which an aqueous solution containing caffeine was passed through the fibers. It was found that the caffeine was captured by the silica particles on the PTFE fibers. The results are shown in FIG. 7. In this case, the efficiency of capturing the caffeine on the PTFE fibers was lower than the efficiency of the glass fibers, and caffeine was eluted in each of the steps. In order to improve these points, more PTFE fibers were used, and the efficiency was improved.

EXAMPLE 4

In the above examples, any one of glass fibers, cellulose fibers or PTFE fibers, respectively, having silica particles made from oligosilica, was used as a material for capturing the objective chemical substance, but a material made of compound fibers can be used as well.

Therefore, in this Example, glass fibers having the above silica particles made from the oligosilica were put into an ethanol solution in which cellulose fibers were dispersed, and the glass fibers and the cellulose fibers were mixed in a proportion of one to one. This mixed solution was moved into a glass filter (glass fibers filter G3) and filtered by suction pressure. A disc sheet (0.3 mm–1 mm thick) of cotton-like mixed fibers was obtained on the glass filter. This disc sheet was a composite material made from the glass fibers having the silica particles and the cellulose fibers.

Figure 8:
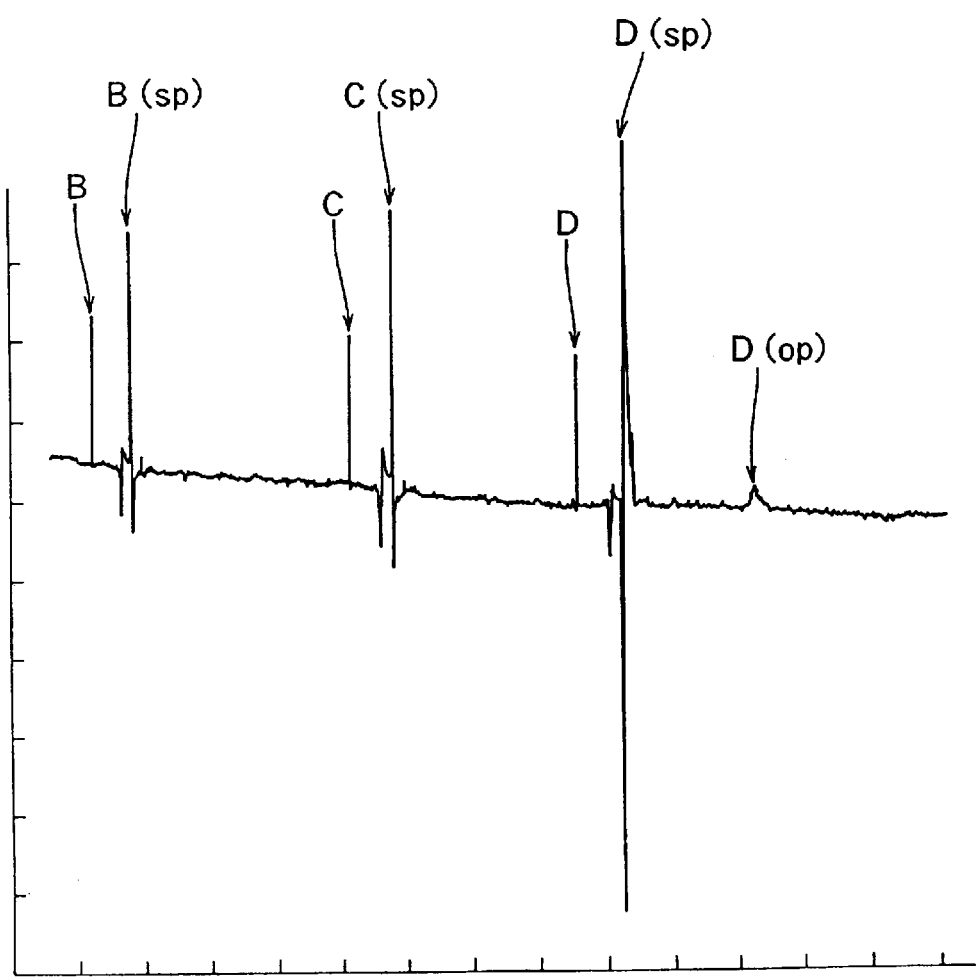
FIG. 8 is a graph of liquid chromatography using the tube according to FIG. 4 for capturing a chemical substance and shows a sample solution of Example 4 in which the compound fibers made from glass fibers and cellulose fibers are used.

The composite disc sheet obtained in this way was cut at random and piled up five-fold (namely, the thickness became 1.5 mm–5 mm). Liquid chromatography was carried out in the same way as described above, and the expected efficiency of capturing the objective substance was obtained. The results are shown in the graph in FIG. 8. In Steps B and C, elution of the caffeine was not seen, and the caffeine was completely recovered in Step D.

EXAMPLE 5

In the above examples, the tube for capturing a chemical substance was used to capture and recover the chemical substance in the solution in a manner that the chemical solution containing the objective chemical substance passed therethrough. However, the material for capturing a chemical substance having metal alkoxide particles on the fibers thereof according to the present invention, or a tube for capturing a chemical substance using the material are not only useful to capture a chemical substance from a liquid, but can also capture a small amount of chemical substance from gas. Namely, an objective chemical substance can be captured from gas in a manner that a gas containing the objective chemical substance passes through the tube. An example is described as follows.

In this example, a benzene vapor was captured from the atmosphere.

As a reference gas, a 10 ppm benzene vapor was prepared in a tetra-bag with an internal volume of 1 liter. Next, glass fibers having the silica particles treated with ODS were assembled and bunched in a syringe. This bunch has a weight of 0.3 g, a volume of 0.35 ml, a height of 7 mm and a diameter of 4 mm. The benzene vapor was captured by passing the reference gas through the bunch. Namely, in a manner where the syringe holding the above bunch (hereinafter referred to as the small syringe) was directly connected to a plug of the tetra-bag, and a large syringe was directly connected to the rear of the small syringe, the reference gas (the 10 ppm benzene vapor) was passed through the bunch of the glass fibers (in the small syringe) being sucked by the large syringe. Since glass fibers hardly have flow resistance to gas, this step for passing gas was carried out quickly.

Figure 9A:
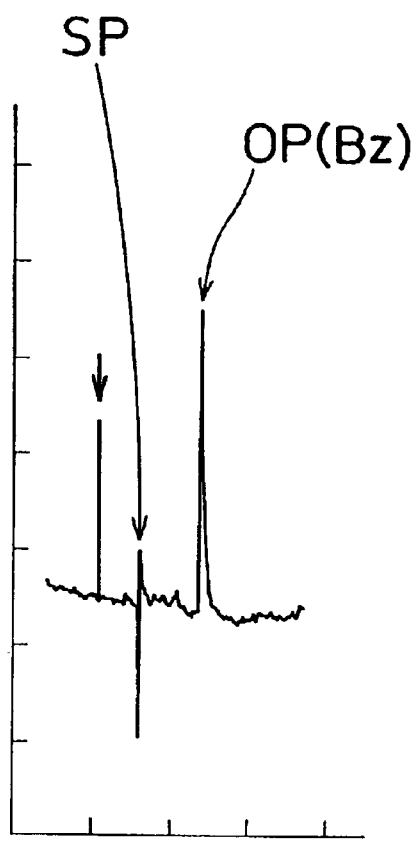
FIG. 9 is a chromatograph of liquid chromatography and shows the result of capturing a chemical substance from gas by using the material according to FIG. 5 for capturing a chemical substance.
Figure 9B:
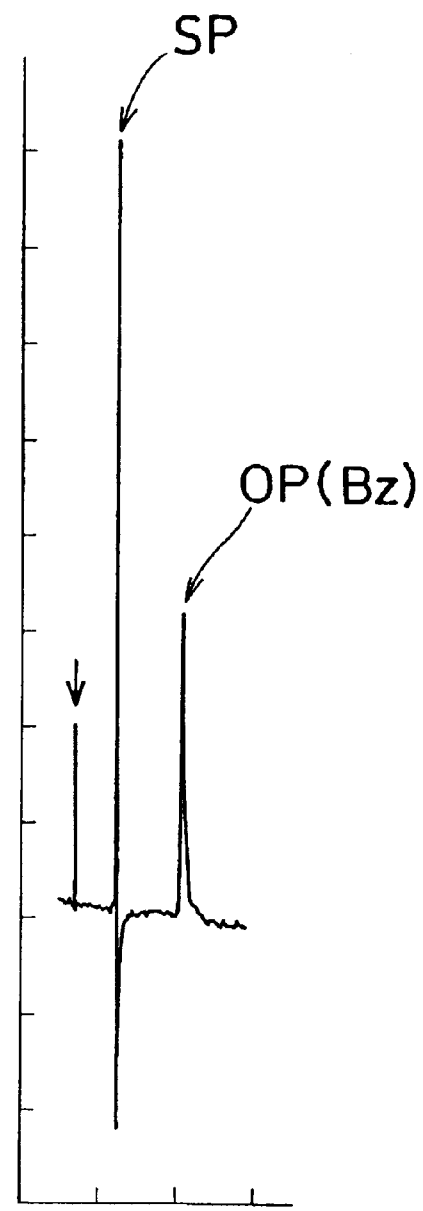

Subsequently, 300 μl of liquid methanol (100% methanol) was poured into the glass fibers, through which the gas had passed, i.e., the glass fibers holding the chemical substance (the benzene vapor) from the atmosphere, and then the chemical substance was recovered and captured from the capturing material. As a result, the benzene vapor in the atmosphere was recovered by a one-pass operation. The result is shown in a chromatograph in FIG. 9(a). For comparison, another result using benzene as a reference sample is also shown in a chromatograph (FIG. 9(b)). The arrows (↓) show the points of pouring the benzene vapor and the reference sample of benzene, and SP and OP(Bz) respectively show a solution peak and an objective peak of benzene.

The silica particles attaching the glass fibers were chemically modified by octadecylsilane in the Producing Process of the glass fibers. The particles which are chemically modified like this repel water and do not hold water, so that they can capture a chemical substance selectively.

Since the material for capturing a chemical substance according to the present invention can capture a chemical substance from the atmosphere effectively, it can be used as materials for an air cleaner to remove chemical substances in the air.

EFFECTS OF THE INVENTION

The present invention, composed as described above, has preferred effects as follows.

(a) It is Easy to Fix the Material in a Tube.

Since the material according to the present invention takes a fibrous form, it is possible for the fibers (the assemblies) having metal alkoxide particles to be inserted into a hollow tube, and it is also possible to retain the material in the tube by frits and fix it there. Therefore, it becomes easy to fix the fibers for capturing a chemical substance in the tube.

(b) Capturing an Objective Constituent from a Diluted Solution is Efficient.

It is possible to capture and recover an objective constituent of a chemical substance from a diluted solution efficiently, in a manner that the diluted solution passes through a tube which has the fibrous material according to the present invention. The material for capturing a chemical substance according to the present invention is made of fibers which have metal alkoxide particles on the surface thereof, and has less flow resistance to liquid than existing products, so that it is favorable to capture an objective chemical substance from a diluted solution effectively.

(c) It Has a High Holding Capacity

The surface area of the material for capturing a chemical substance is large because metal alkoxide particles are attached on the surfaces of the fibrous material. Accordingly, it can hold an adequate amount of objective chemical substance (a loading dose) from a diluted sample, and the holding capacity is improved. Furthermore, if the particles on the surfaces of the fibrous material are chemically modified, the holding capacity is further improved.

(d) It can Capture a Chemical Substance from Gas

The material having metal alkoxide particles according to the present invention can have the fibers held in a state of low density by the characteristics of fibrous formation to be used for capturing a diluted objective chemical substance from gas. With the fibrous material in a state of low density, the flow resistance of the material becomes very low. Therefore, the material reveals its excellent capacity, while rarely causing pressure loss at the time of repetitive suction by a gas sampler. Furthermore, it can treat a huge amount of gas at a time.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A material for capturing a chemical substance, the material comprising fibers having metal alkoxide particles on surfaces of the fibers.

2. The material for capturing a chemical substance according to claim 1, wherein the metal alkoxide particles are made from at least one of oligosilica, oligozirconia and oligotitania.

3. The material for capturing a chemical substance according to claim 2, wherein the fibers comprise any of inorganic fibers, regenerated fibers, synthetic fibers and combinations thereof.

4. The material for capturing a chemical substance according to claim 1, wherein the fibers comprise any of inorganic fibers, regenerated fibers, synthetic fibers and combinations thereof.

5. The material for capturing a chemical substance according to claim 1, wherein the material has a form of an air cleaner to remove the chemical substance from air.

6. A tube for capturing a chemical substance using a material according to claim 1, comprising a hollow tube having at least one frit, wherein the material is held by the frit so as to capture a small amount of the chemical substance from a liquid passing therethrough.

7. A tube for capturing a chemical substance using a material according to claim 1, comprising a hollow tube, wherein the material is held in the hollow tube so as to capture a small amount of the chemical substance from a gas passing therethrough.

8. The tube for capturing a chemical substance according to claim 7, wherein the fibers of the material are lightly held in a state of low density.

9. The tube for capturing a chemical substance according to claim 7, wherein the fibers of the material are assembled and held in a bunch.

10. A method for producing a material for capturing a chemical substance comprising the steps of:
    treating surfaces of fibers to facilitate fixation of metal alkoxide particles to the fibers;
    forming the metal alkoxide particles on the surfaces; and
    fixing the metal alkoxide particles to the surfaces.

11. The method for producing a material for capturing a chemical substance according to claim 10, wherein the metal alkoxide particles are made from oligomers having a polymerization degree in a range of 10 to 20.

12. The method for producing a material for capturing a chemical substance according to claim 11, wherein the treating step includes at least one of alkali treatment, surface treatment with a silylation agent and coating treatment with water glass.

13. The method for producing a material for capturing a chemical substance according to claims 12, wherein the forming step includes a step of applying oligomers of the metal alkoxide on the surfaces of the fibers and a subsequent step of placing the fibers in an aqueous alkali solution to form the metal alkoxide particles.

14. The method for producing a material for capturing a chemical substance according to claims 13, wherein the fixing step includes heat treatment of the fibers by continuous heating.

15. The method for producing a material for capturing a chemical substance according claims 14, further comprising a step of chemically modifying the metal alkoxide particles.

16. The method for producing a material for capturing a chemical substance according claims 13, further comprising a step of chemically modifying the metal alkoxide particles.

17. The method for producing a material for capturing a chemical substance according to claims 12, wherein the fixing step includes heat treatment of the fibers by continuous heating.

18. The method for producing a material for capturing a chemical substance according claims 17, further comprising a step of chemically modifying the metal alkoxide particles.

19. The method for producing a material for capturing a chemical substance according claims 12, further comprising a step of chemically modifying the metal alkoxide particles.

20. The method for producing a material for capturing a chemical substance according to claims 11, wherein the forming step includes a step of applying oligomers of the metal alkoxide on the surfaces of the fibers and a subsequent step of placing the fibers in an aqueous alkali solution to form the metal alkoxide particles.

21. The method for producing a material for capturing a chemical substance according to claims 20, wherein the fixing step includes heat treatment of the fibers by continuous heating.

22. The method for producing a material for capturing a chemical substance according claims 21, further comprising a step of chemically modifying the metal alkoxide particles.

23. The method for producing a material for capturing a chemical substance according claims 20, further comprising a step of chemically modifying the metal alkoxide particles.

24. The method for producing a material for capturing a chemical substance according to claims 11, wherein the fixing step includes heat treatment of the fibers by continuous heating.

25. The method for producing a material for capturing a chemical substance according claims 24, further comprising a step of chemically modifying the metal alkoxide particles.

26. The method for producing a material for capturing a chemical substance according claims 11, further comprising a step of chemically modifying the metal alkoxide particles.

27. The method for producing a material for capturing a chemical substance according to claim 10, wherein the treating step includes at least one of alkali treatment, surface treatment with a silylation agent and coating treatment with water glass.

28. The method for producing a material for capturing a chemical substance according to claims 27, wherein the forming step includes a step of applying oligomers of the metal alkoxide on the surfaces of the fibers and a subsequent step of placing the fibers in an aqueous alkali solution to form the metal alkoxide particles.

29. The method for producing a material for capturing a chemical substance according to claims 28, wherein the fixing step includes heat treatment of the fibers by continuous heating.

30. The method for producing a material for capturing a chemical substance according claims 29, further comprising a step of chemically modifying the metal alkoxide particles.

31. The method for producing a material for capturing a chemical substance according claims 28, further comprising a step of chemically modifying the metal alkoxide particles.

32. The method for producing a material for capturing a chemical substance according to claims 27, wherein the fixing step includes heat treatment of the fibers by continuous heating.

33. The method for producing a material for capturing a chemical substance according claims 32, further comprising a step of chemically modifying the metal alkoxide particles.

34. The method for producing a material for capturing a chemical substance according claims 27, further comprising a step of chemically modifying the metal alkoxide particles.

35. The method for producing a material for capturing a chemical substance according to claims 10, wherein the forming step includes a step of applying oligomers of the metal alkoxide on the surfaces of the fibers and a subsequent step of placing the fibers in an aqueous alkali solution to form the metal alkoxide particles.

36. The method for producing a material for capturing a chemical substance according to claims 35, wherein the fixing step includes heat treatment of the fibers by continuous heating.

37. The method for producing a material for capturing a chemical substance according claims 35, further comprising a step of chemically modifying the metal alkoxide particles.

38. The method for producing a material for capturing a chemical substance according claims 35, further comprising a step of chemically modifying the metal alkoxide particles.

39. The method for producing a material for capturing a chemical substance according to claims 10, wherein the fixing step includes heat treatment of the fibers by continuous heating.

40. The method for producing a material for capturing a chemical substance according claims 39, further comprising a step of chemically modifying the metal alkoxide particles.

41. The method for producing a material for capturing a chemical substance according claims 10, further comprising a step of chemically modifying the metal alkoxide particles.

* * * * *

UNITED STATES PATENT AND TRADEMARK OFFICE
CERTIFICATE OF CORRECTION

PATENT NO. : 6,723,157 B2
DATED : April 20, 2004
INVENTOR(S) : Takao Tsuda and Motonori Munesue It is certified that error appears in the above-identified patent and that said Letters Patent is hereby corrected as shown below:

Title page,
Item [75], Inventors, "Matsubara" should read -- Matsubara-shi --

Column 10,
Line 32, "claims 35" should read -- claim 36 --.

Signed and Sealed this

Sixteenth Day of November, 2004

JON W. DUDAS
*Director of the United States Patent and Trademark Office*